US010404816B2

(12) United States Patent
Chuchro et al.

(10) Patent No.: US 10,404,816 B2
(45) Date of Patent: Sep. 3, 2019

(54) DETERMINING BROWSING ACTIVITIES

(71) Applicant: Microsoft Technology Licensing, LLC., Redmond, WA (US)

(72) Inventors: Paula J. Chuchro, Seattle, WA (US); Michael John Patten, Sammamish, WA (US); Akriti Dokania, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 337 days.

(21) Appl. No.: 14/562,198

(22) Filed: Dec. 5, 2014

(65) Prior Publication Data

US 2016/0164984 A1     Jun. 9, 2016

(51) Int. Cl.
*H04L 29/08* (2006.01)
(52) U.S. Cl.
CPC .............. *H04L 67/22* (2013.01); *H04L 67/02* (2013.01)
(58) Field of Classification Search
CPC ................................ H04L 67/22; H04L 67/02
USPC ......................................................... 709/224
See application file for complete search history.

(56) References Cited

U.S. PATENT DOCUMENTS

| | | | |
|---|---|---|---|
| 7,673,233 B2 | 3/2010 | Moore et al. | |
| 8,560,549 B1 * | 10/2013 | Pedersen | G06F 17/3089 707/739 |
| 8,560,964 B2 * | 10/2013 | Dodson | G06F 16/957 715/819 |
| 8,655,819 B1 * | 2/2014 | Burkard | G06N 5/048 706/45 |
| 8,683,374 B2 | 3/2014 | Vaughan et al. | |
| 8,954,524 B1 * | 2/2015 | Hamon | G06Q 30/00 709/213 |
| 9,117,002 B1 * | 8/2015 | Jenkins | H04L 67/1095 |
| 9,286,246 B2 * | 3/2016 | Saito | G06F 13/00 |
| 9,383,958 B1 * | 7/2016 | Trahan | G06F 3/14 |
| 2006/0078160 A1 * | 4/2006 | Fujita | G06F 17/30017 382/100 |
| 2008/0301562 A1 * | 12/2008 | Berger | G06F 17/3089 715/733 |
| 2009/0287657 A1 * | 11/2009 | Bennett | G06F 17/30867 |
| 2010/0070928 A1 | 3/2010 | Goodger et al. | |
| 2012/0066645 A1 | 3/2012 | Laurie et al. | |

(Continued)

OTHER PUBLICATIONS

"Internet Explorer 8 Beta 2", Evaluators' Guide, Microsoft Corp. Available at <http://www.google.co.in/url?sa=t&rct=j&q=&esrc=s&frm=1&source=web&cd=6&cad=rja&uact=8&ved=0CEEQFjAF&url=http%3A%2F%2Fdownload.microsoft.com%2Fdownload%2F%2F7%2Ff%2F97f5e019-20b9-47b4-bf0c-e7ad38ef2faf%2FIE8, Aug. 2008, 93 pages.

(Continued)

*Primary Examiner* — Tauqir Hussain

(57) ABSTRACT

Determining browsing activities is described. In one or more implementations, browsing history data, indicating navigation to websites using a web platform, is analyzed to determine a browsing activity, such as shopping, planning a trip, and so forth. The websites navigated to using the web platform as part of the browsing activity are then stored with the browsing activity to enable subsequent access to the websites. In one or more implementations, for each browsing activity, one or more suggested websites which are related to the browsing activity are determined and stored with the browsing activity to enable access to the suggested websites.

20 Claims, 8 Drawing Sheets

(56) References Cited

U.S. PATENT DOCUMENTS

| | | | | |
|---|---|---|---|---|
| 2012/0130969 A1* | 5/2012 | Wong | ............... | G06F 17/30867 |
| | | | | 707/706 |
| 2013/0061159 A1 | 3/2013 | Tseng et al. | | |
| 2013/0061160 A1 | 3/2013 | Tseng | | |
| 2013/0254685 A1* | 9/2013 | Batraski | ............. | H04L 67/1095 |
| | | | | 715/760 |
| 2014/0164404 A1* | 6/2014 | Hunt | ................ | G06F 17/30867 |
| | | | | 707/754 |
| 2015/0324434 A1* | 11/2015 | Greenwood | ............ | G06N 5/04 |
| | | | | 707/722 |
| 2017/0220692 A1* | 8/2017 | Greenwood | ............ | G06N 5/04 |

OTHER PUBLICATIONS

Huang, et al., "Parallel Browsing Behavior on the Web", In Proceedings of the 21st ACM conference on Hypertext and hypermedia, Jun. 13, 2010, 5 pages.

White, et al., "Predicting User Interests from Contextual Information", In Proceedings of the 32nd international ACM SIGIR conference on Research and development in information retrieval, Jul. 19, 2009, 8 pages.

* cited by examiner

DETERMINING BROWSING ACTIVITIES

BACKGROUND

Users of web browsers today constantly redo their work (e.g., searching for and browsing to websites) to continue recent or frequent browsing activities, such as shopping for a particular clothing item or researching a particular topic. Some conventional web browsers provide a frequent sites user interface that displays frequently-visited and/or recently-visited websites for a user. However, these conventional web browsers are limited because browsing activities often occur across multiple different websites, and over a magnitude of time of hours, weeks, or even months.

SUMMARY

Determining browsing activities is described. In one or more implementations, browsing history data, indicating navigation to websites using a web platform, is analyzed to determine a browsing activity, such as shopping, planning a trip, and so forth. The websites navigated to using the web platform as part of the browsing activity are then stored with the browsing activity to enable subsequent access to the websites. In one or more implementations, for each browsing activity, one or more suggested websites which are related to the browsing activity are determined and stored with the browsing activity to enable access to the suggested websites.

In one or more implementations, the web platform can display an activity user interface which provides an indication of one or more browsing activities. For each browsing activity, the activity user interface may provide a summary of the websites navigated to using the web platform as part of the browsing activity, and enable the user to resume the browsing activity, such as by launching each of the websites associated with the browsing activity in different tabs of the web platform. Additionally, the activity user interface may include one or more suggested websites that are related to the browsing activity to enable navigation to the suggested websites using the web platform.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. The same numbers are used throughout the drawings to reference like features and components.

DETAILED DESCRIPTION

Overview

Figure 1:
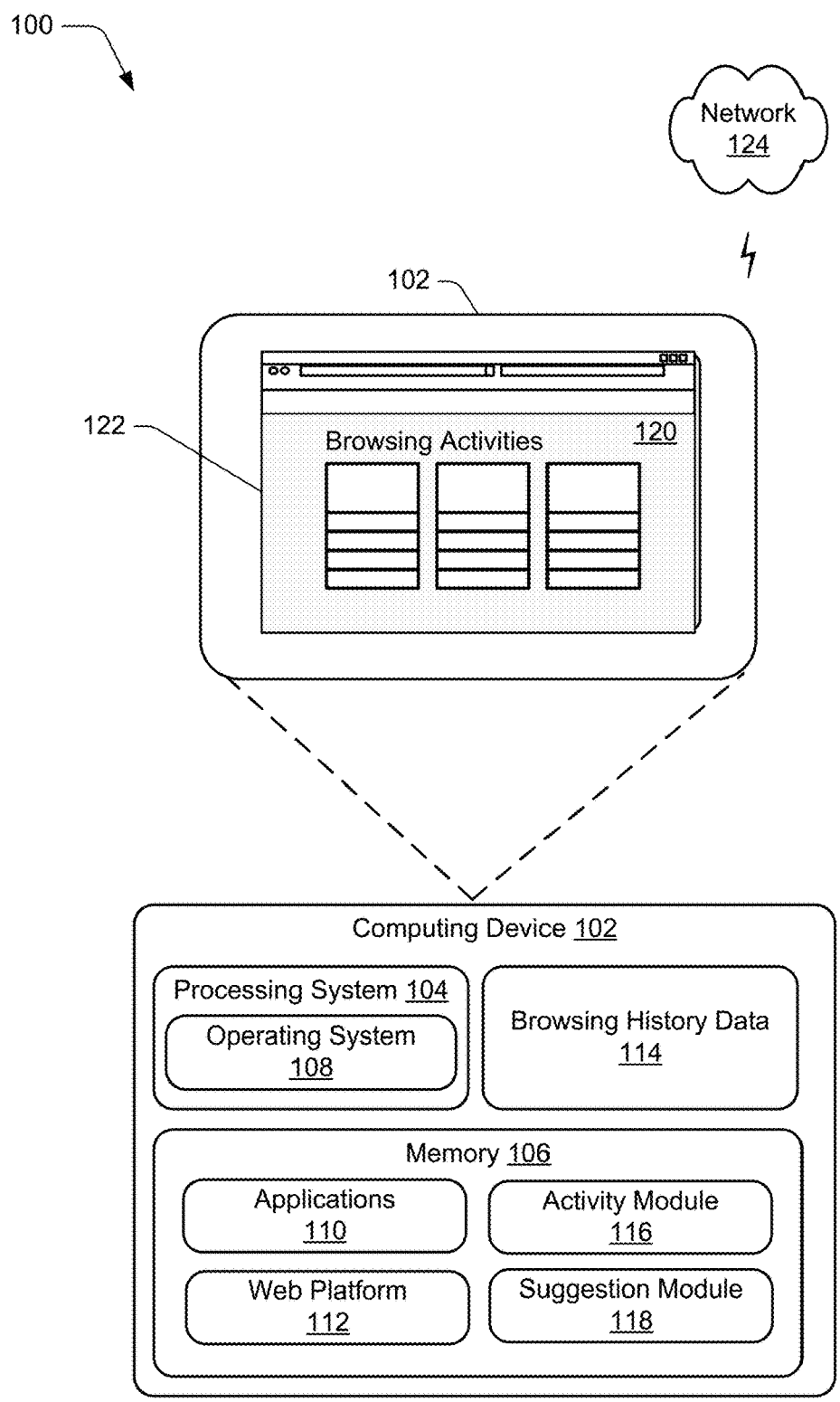
FIG. 1 is an illustration of an environment in an example implementation that is operable to support techniques described herein.

Users of conventional web browsers constantly redo their work to continue recent and/or frequent browsing activities which are not limited to a single website. For example, a user shopping for a leather jacket using a web browser may browse to various websites in order to find a leather jacket to purchase. Conventional web browsers do not recognize that the user is shopping for a leather jacket, and thus do not track and save each website that the user has visited while shopping for the leather jacket.

Techniques described herein, however, are configured to intelligently bring together the disparate parts of a browsing activity or task (e.g., shopping for a leather jacket) which may be spread across multiple websites and/or different browsing sessions, and summarize the browsing activity meaningfully to allow the user to easily resume the browsing activity or task. Doing so increases the user's efficiency of performing the browsing activity because the user does not need to manually save specific websites related to a browsing activity, or try to remember the websites that were previously visited, when the browsing activity is resumed.

Additionally, conventional web browsers are unable to recognize that the user is performing a specific browsing activity, and thus do not provide suggestions or recommendations to the user that are relevant or related to the particular browsing activity.

Thus, in one or more implementations, suggestions are provided for the user, such as by recommending websites that are relevant to the browsing activity. For example, a user may be searching for a product on amazon.com, but be unaware of the shopping website etsy.com. In this case, the techniques can determine that the user is shopping for a particular item, and then automatically perform a search for that particular item on the website etsy.com. If the item is found on etsy.com, the website on etsy.com can be provided to the user. Thus, the techniques search for and discover websites automatically without requiring the user to search for these various websites across disparate places on the web.

In one or more implementations, a web platform (e.g., a web browser) can display an activity user interface which provides an indication of one or more browsing activities. For each browsing activity, the activity user interface may provide a summary of the websites previously navigated to using the web platform as part of the browsing activity, and enable the user to resume the browsing activity, such as launching each of the websites associated with the browsing activity in different tabs of the web platform. Additionally, the activity user interface may include one or more suggested websites that are related to the browsing activity, and enable the user to quickly navigate to these suggested websites using the web platform. In some cases, the activity user interface is displayed in a new tab page of the web platform to enable the use to quickly and easily resume the browsing activity.

Example Environment

FIG. 1 is an illustration of an environment 100 in an example implementation that is operable to support techniques described herein. The illustrated environment 100 includes a computing device 102 having one or more hardware components, examples of which include a processing system 104 and a computer-readable storage medium that is illustrated as a memory 106 although other components are also contemplated as further described below.

The computing device 102 may be configured in a variety of ways. For example, a computing device may be configured as a computer that is capable of communicating over a network, such as a desktop computer, a mobile station, an entertainment appliance, a set-top box communicatively coupled to a display device, a wireless phone, a game console, educational interactive devices, point of sales devices, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations such as by a web service, a remote control and set-top box combination, an image capture device and a game console configured to capture gestures, and so on. In addition, it may apply to apparatuses including a plurality of display devices. Additionally, in one or more implementations, computing device 102 may be configured in a vehicle such as a car, boat, plane, and so forth. In this case, the vehicle's dashboard, or any type of display within the vehicle, may incorporate the techniques described herein.

The computing device 102 is further illustrated as including an operating system 108, although other embodiments are also contemplated in which an operating system is not employed. The operating system 108 is configured to abstract underlying functionality of the computing device 102 to applications 110 that are executable on the computing device 102. For example, the operating system 108 may abstract the processing system 104, memory 106, and/or network functionality of the computing device 102 such that the applications 110 may be written without knowing "how" this underlying functionality is implemented. The application 110, for instance, may provide data to the operating system 108 to be rendered and displayed by a display module without understanding how this rendering will be performed. The operating system 108 may also represent a variety of other functionality, such as to manage a file system and user interface that is navigable by a user of the computing device 102.

Computing device 102 also includes a web platform 112. Web platform 112 works in connection with content of the web, e.g. public content such as websites and the like. A web platform can include and make use of many different types of technologies such as, by way of example and not limitation, URLs, HTTP, REST, HTML, CSS, JavaScript, DOM, and the like. The web platform can also work with a variety of data formats such as XML, JSON, and the like. Web platforms can include web browsers, local applications such as a Windows® Store application, and the like. In the examples described below, a web platform in the form of a web browser that navigates to various websites is utilized. It is to be appreciated and understood, however, that the inventive principles can be employed by web platforms other than web browsers.

Computing device 102 may include browsing history data 114 that stores web addresses (e.g., URLs) of websites navigated to using web platform 112. As described herein, the term "website" is used to refer to websites or web pages that can be navigated to via a web platform using a web address of the website. Examples of web addresses include uniform resource locators (URLs), uniform resource identifiers (URIs), internationalized resource identifiers (IRIs), and internationalized domain names (IDNs).

In one or more implementations, browsing history data may also include user interactions with resources other than websites. For example, browsing history data may include application usage data (e.g., a list of word processing applications, media player applications, or social media applications used by a user of computing device 102), document usage (e.g., word processing documents or spreadsheets created using applications), and media content usage (e.g., music files or video files played back at computing device 102). It is to be appreciated, however, that browsing history data 114 may store data associated with user interactions with a variety of different types of resources. Additionally, while illustrated as being stored at computing device 102, in some cases browsing history data 114 may be stored remote from computing device 102 (e.g., in the cloud).

Computing device 102 is illustrated as including an activity module 116 and a suggestion module 118. Activity module 116 and suggestion module 118 can be stored on computer-readable storage memory (e.g., memory 106), such as any suitable memory device or electronic data storage implemented by the mobile device. In implementations, activity module 116 and suggestion module 118 are components of the device operating system.

Activity module 116 is representative of functionality to perform one or more techniques to determine one or more browsing activities using web platform 112 based on data stored in browsing history data 114. In addition, activity module 116 can provide a summary of each browsing activity as well as enable subsequent access to the websites previously navigated to using web platform 112 as part of the browsing activity. Further discussion of activity module 116 may be found with reference to FIG. 2, below.

Suggestion module 118 is representative of functionality to perform one or more techniques to provide suggestions for each browsing activity by locating websites related to the browsing activity. Further discussion of suggestion module 118 may be found with reference to FIG. 3, below.

Web platform 112 is configured to render an activity user interface 120 on a display 122 of computing device 102. Activity user interface 120 enables the user to resume a browsing activity by launching websites previously navigated to as part of the browsing activity. Activity user interface 120 may also enable the user to navigate to suggested websites that are related to the browsing activity. Further discussion of activity user interface 120 is discussed with regards to FIG. 4 below.

Figure 8:
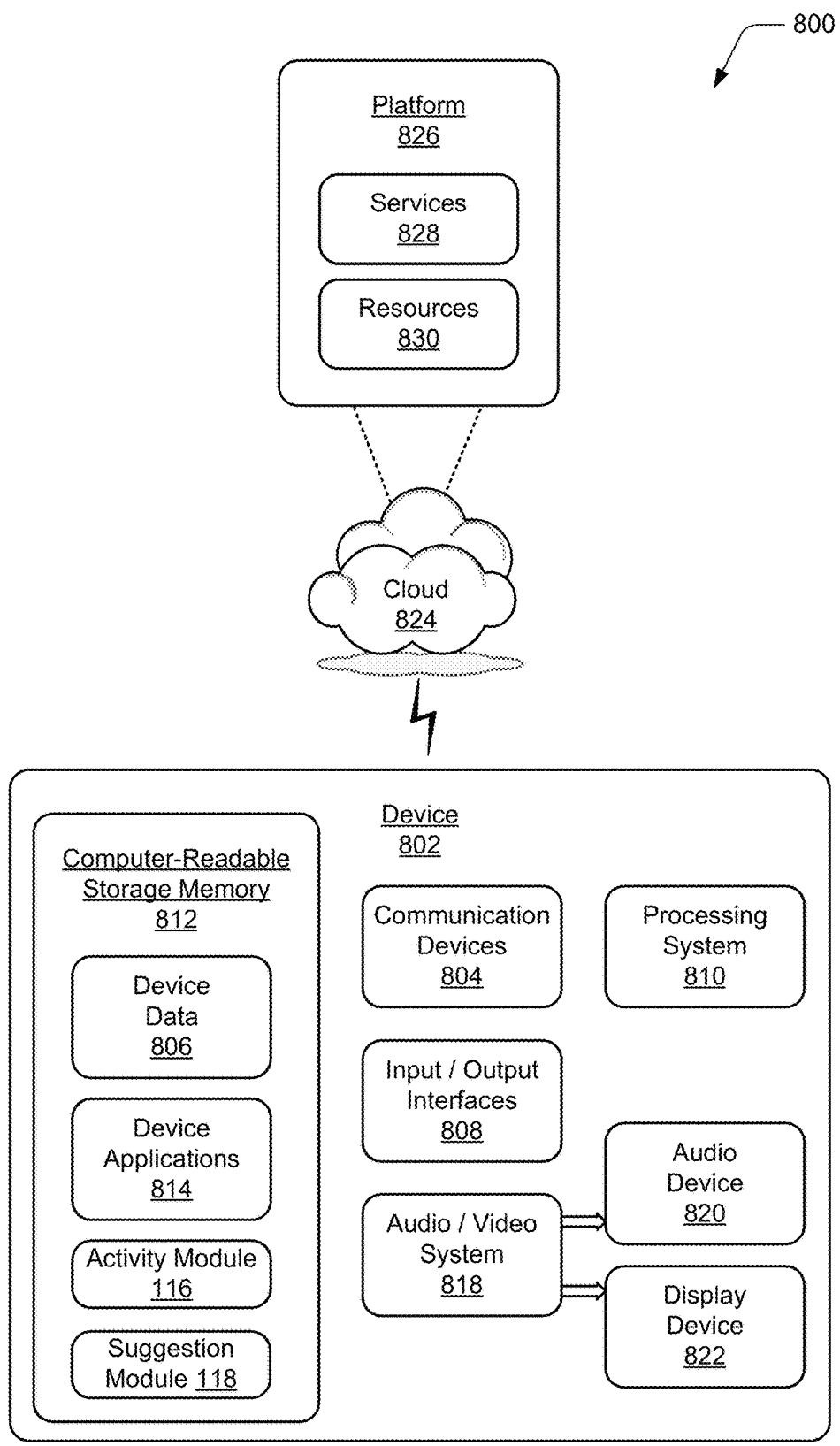
FIG. 8 illustrates an example system that includes an example device, which can implement embodiments of determining browsing activities.

Although illustrated as part of computing device 102, functionality of activity module 116 and suggestion module 118 may also be implemented in a distributed environment, remotely via a network 124 (e.g., "over the cloud") as further described in relation to FIG. 8, and so on. Although network 124 is illustrated as the Internet, the network may assume a wide variety of configurations. For example, network 124 may include a wide area network (WAN), a local area network (LAN), a wireless network, a public telephone network, an intranet, and so on. Further, although a single network 124 is shown, 122 may also be configured to include multiple networks.

Activity Module

Figure 2:
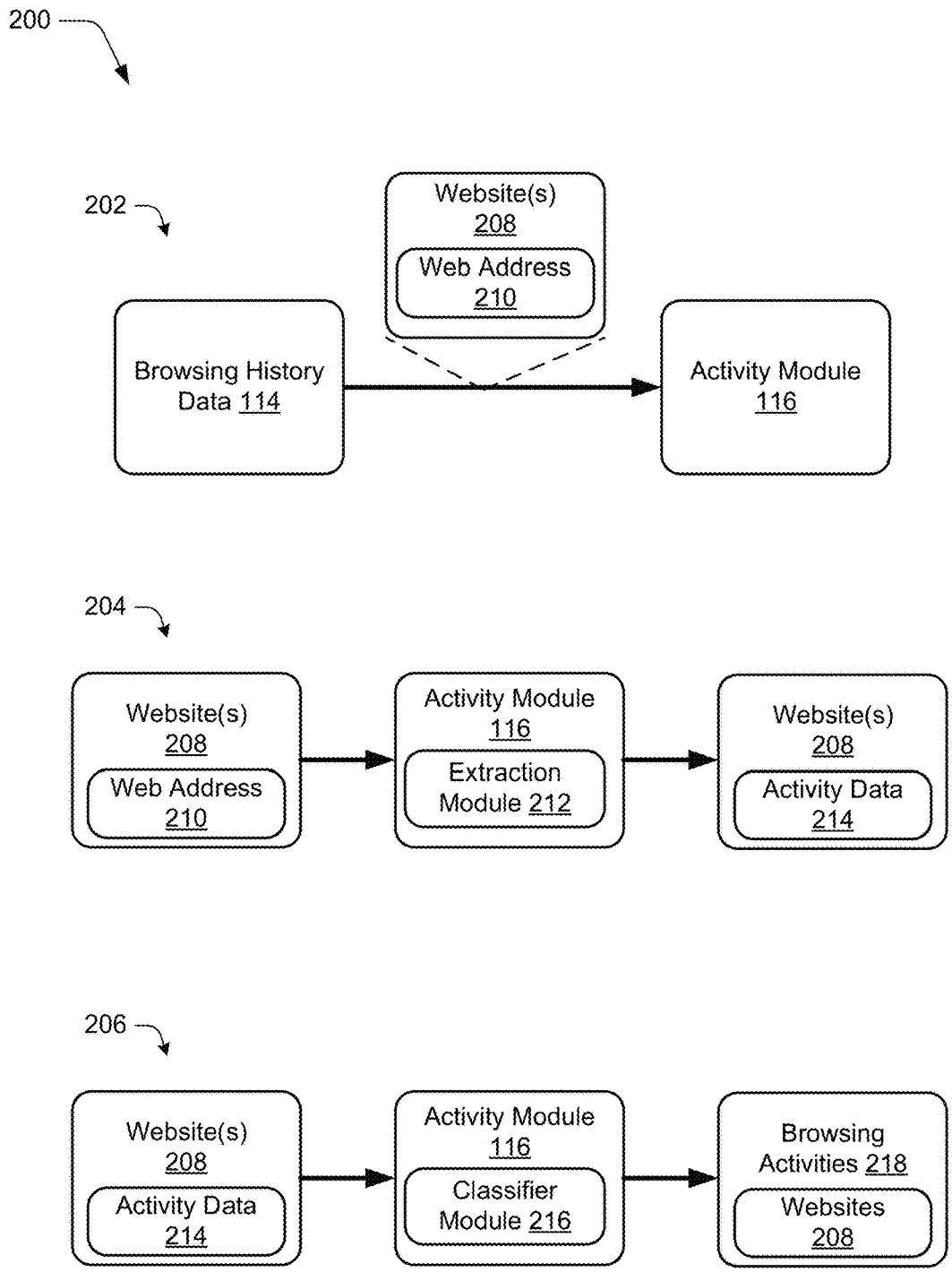
FIG. 2 illustrates a system in which an activity module may be implemented

FIG. 2 illustrates a system 200 in which an activity module may be implemented. System 200 is illustrated through the use of first, second, and third stages 202, 204, and 206.

At first stage 202, activity module 116 receives browsing history data 114 which includes indications of websites 208, and associated web addresses 210 (e.g., URL's), browsed to using web platform 112. Browsing history data 114 may include websites browsed to during multiple different browsing sessions and/or using multiple different computing devices. For example, in some cases a user's browsing history may include websites navigated to using web platform 112 on the user's laptop as well as websites navigated to using another instance of web platform 112 on the user's smartphone. Further, as discussed in more detail below, in some cases browsing history data 114 may include a history of user interactions with resources other than websites 208, such as applications, documents, media content files, and so forth.

At second stage 204, activity module 116 is illustrated as including an extraction module 212 that extracts information from websites 208 identified in browsing history data 114 and generates activity data 214 based on the extracted information. Activity data 214 corresponds to information associated with websites 208 which may be used to classify an activity type of each website 208.

In one or more implementations, the page content of websites 208 can be parsed and analyzed by extraction module 212 to generate activity data 214. For example, extraction module 212 can extract information from the page title of websites 208, page headers of websites 208, or any other content or elements within the page of websites 208, such as text, images, video, prices, a shopping cart, and so forth.

In one or more implementations, extraction module 212 parses web addresses 210 of each website 208 in browsing history data 114 to extract activity data 214. For example, activity data 214 may include content of web address 210, a domain of web address 210, a sub domain of web address 210, search terms within web address 210, and so forth.

Consider an example URL of a website navigated to by web platform 112 responsive to searching for "modern black chair" on the website amazon.com.

http://www.amazon.com/Leather-Modern-Adjustable-
      Barstools-Hydraulic/dp/B00GS7EOA6/
      ref=sr$_{13}$1_1?ie=UTF8&qid=1413301466&sr=8-
      1&keywords=modern+black+chair In the example above, this URL can be parsed by extraction module 212 to identify activity data 214 which includes content of the website ("Leather Modern Adjustable Barstools Hydraulic"), a domain of the website ("amazon"), and search terms of the website ("modern, black, and chair").

At third stage 206, activity module 116 is illustrated as including a classifier module 216 which receives websites 208 and the associated activity data 214 determined at second stage 204. Classifier module 216 analyzes activity data 214 to determine one or more browsing activities 218, such as shopping, planning a trip, and so forth.

In some cases, browsing activity 218 may include both a category of the browsing activity and a topic of the browsing activity. Consider, for example, the browsing activity "shopping for a modern black chair". In this case, the category of the browsing activity is "shopping", while the topic of the browsing activity is "modern black chair". Other examples of browsing activities that include both a category and a topic include planning a trip to Maui, reading about the Seattle Seahawks, and so forth.

In one or more implementations, classifier module 216 can determine the category of the browsing activity based on the domain identified in activity data 214. To do so, classifier module 216 can compare the domain of each website to a database that associates domains with browsing activities. For example, the websites of ebay.com and amazon.com may each be associated with shopping in the database. Thus, classifier module 216 may classify an activity type of websites with the domain of "amazon" or "ebay" as "shopping".

Similarly, the sub domain may also be indicative of the browsing activity, and in some cases may change the classification of the browsing activity. This is because certain sub domains within a website may correspond to different browsing activities. For example, if web platform 112 accesses a sub domain of ebay.com that corresponds to seller portals, then activity module 116 may determine that the browsing activity corresponds to "selling" instead of "shopping". Similarly, the website espn.com may include sub domains corresponding to baseball, in which case the browsing activity may correspond to "reading about baseball". However, espn.com may also include sub domains corresponding to fantasy football, in which case the browsing activity may correspond to "playing fantasy football".

In one or more implementations, classifier module 216 can determine a topic of the browsing activity based on search terms identified in activity data 214. For example, if search terms within the web address of a website on ebay.com include "black chair" and "modern black chair", then activity module 116 may determine that the topic of the browsing activity corresponds to "black chairs", and more specifically to "modern black chairs".

Search terms across multiple website domains may also be indicative of a browsing activity. For example, if search terms of websites 208 that the user visits all contain "Seahawks", then activity module 116 may determine that each of these websites 208 correspond to the browsing activity of reading about the Seattle Seahawks.

After classifying websites 208 with activity types, classifier module 216 generates a browsing activity 218. In some cases, classifier module 216 generates browsing activity 218 if multiple websites 208, on the same or different domains, are located with similar activity data 214 or similar activity types. Classifier module 216 may apply a confidence metric to activity data 214 for two or more websites to determine how likely it is that both websites correspond to a certain browsing activity 218. For example, if two websites on the same domain, or different domains associated with shopping, each include similar search terms, then classifier module 216 may generate a browsing activity 218. The confidence metric may also consider time and frequency of navigation to websites 218 to determine the likelihood of browsing activity 218.

For each determined browsing activity 218, activity module 116 stores the websites 208 that were navigated to using web platform 112 as a part of the browsing activity to enable subsequent access to the websites. For example, activity module 116 can store links associated with websites 208 navigated to using web platform 112 while shopping for a modern black chair, such as websites selling a modern black chair on both amazon.com and ebay.com. It is to be appreciated, therefore, that the websites 208 stored with the browsing activity may include websites across multiple different domains. Subsequently, the websites 208 associated with browsing activity 218 can be provided to the user during a subsequent browsing session to enable the user to quickly resume the browsing activity.

In some cases, the stored websites 208 for a browsing activity may correspond to the last state of the browsing activity at the completion of a browsing session. For example, the user may have opened multiple tabs open in web platform 112, each corresponding to websites associated with a browsing activity. In this case, the multiple tabs can be stored with the browsing activity to enable the user to resume the browsing activity during a subsequent browsing session.

In one or more implementations, web platform 112 causes display of browsing activities 218, and a summary of websites 208 associated with each browsing activity, in activity user interface 120, which is discussed in more detail below with regards to FIGS. 4 and 5.

Suggestion Module

Figure 3:
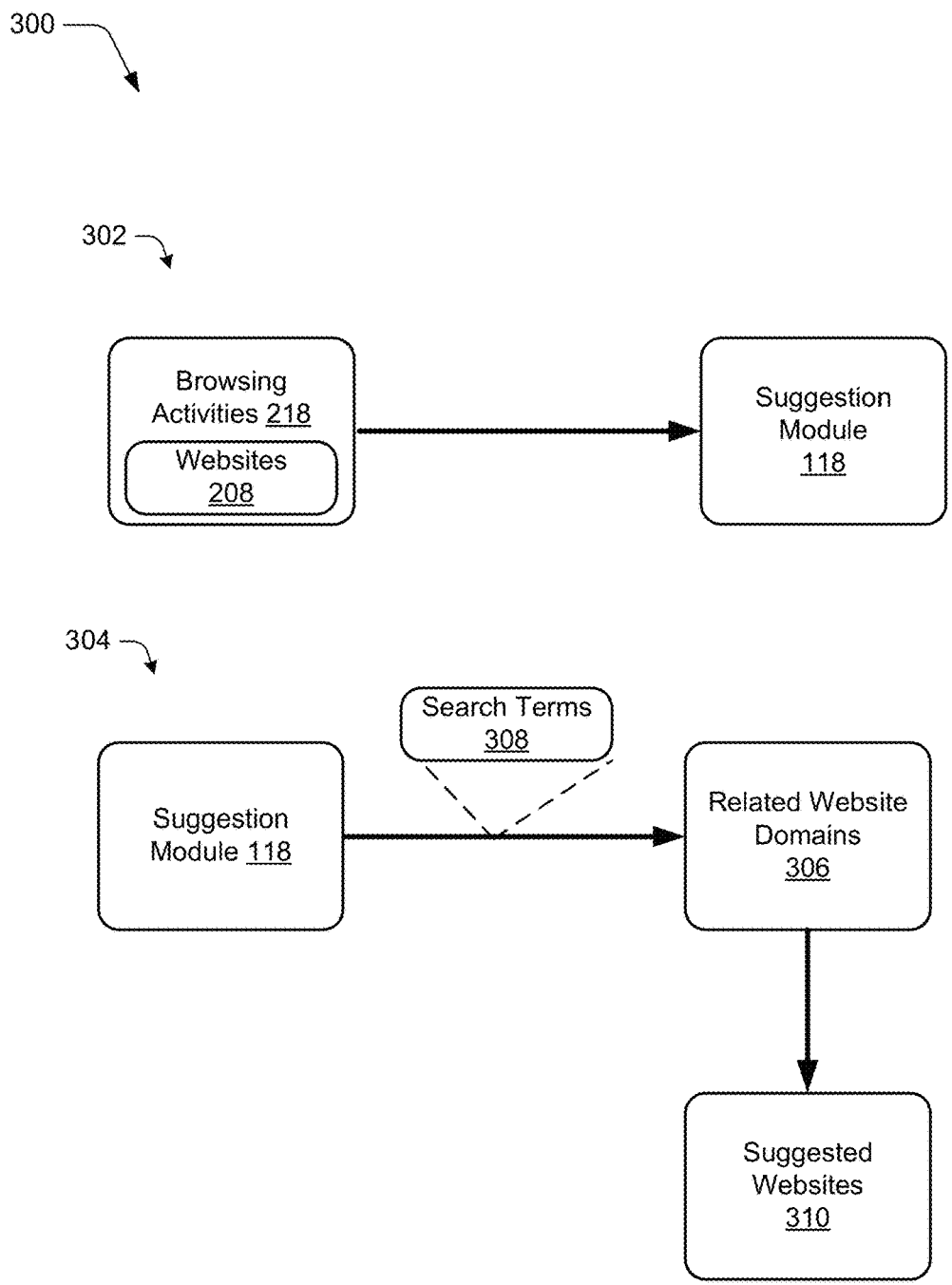
FIG. 3 illustrates a system in which a suggestion module may be implemented.

FIG. 3 illustrates a system 300 in which a suggestion module may be implemented. The system 300 is illustrated through the use of first and second stages 302 and 304.

At first stage 302, suggestion module 118 receives browsing activities 218, and websites 208 related to each browsing activity, from activity module 116.

Suggestion module 118 is configured to determine, for each browsing activity 218, one or more suggested websites that are related to the browsing activity. To do so, at second stage 304, suggestion module 118 identifies related website domains 306 which are related to each browsing activity 218. For example, if the browsing activity is shopping, suggestion module 118 can identify website domains which are classified as "shopping" domains, such as amazon.com, ebay.com, etsy.com, and so forth. To identify related website domains 306, suggestion module 118 may access a database which categorizes website domains by activity types.

Suggestion module 118 can be implemented to identify related website domains 306 which were not previously accessed using web platform 112. For example, suggestion module 118 can compare the websites 208 previously browsed to as part of each browsing activity 218, and remove any related website domains 306 which were already accessed using web platform 112.

Next, suggestion module 118 identifies search terms 308 associated with each browsing activity 218, and conducts a search on related web site domains 306 using search terms 308 to locate one or more suggested websites 310. For example, if the browsing activity is "shopping for a modern black chair", suggestion module 118 identify website domains related to shopping that were not previously accessed using web platform 112, such as etsy.com. Then, suggestion module 118 searches the identified website domains using search terms 308 that are determined based on the browsing activity. Continuing with the example from above, suggestion module 118 may search for "modern black chair" on etsy.com.

Based on the search results, suggestion module 118 generates suggested websites 310. For example, if a website is found on etsy.com that includes a modern black chair that is for sale, this website may be identified as a suggested website 310 that is related to the browsing activity 218 of shopping for a modern black chair.

Activity User Interface

Figure 4:
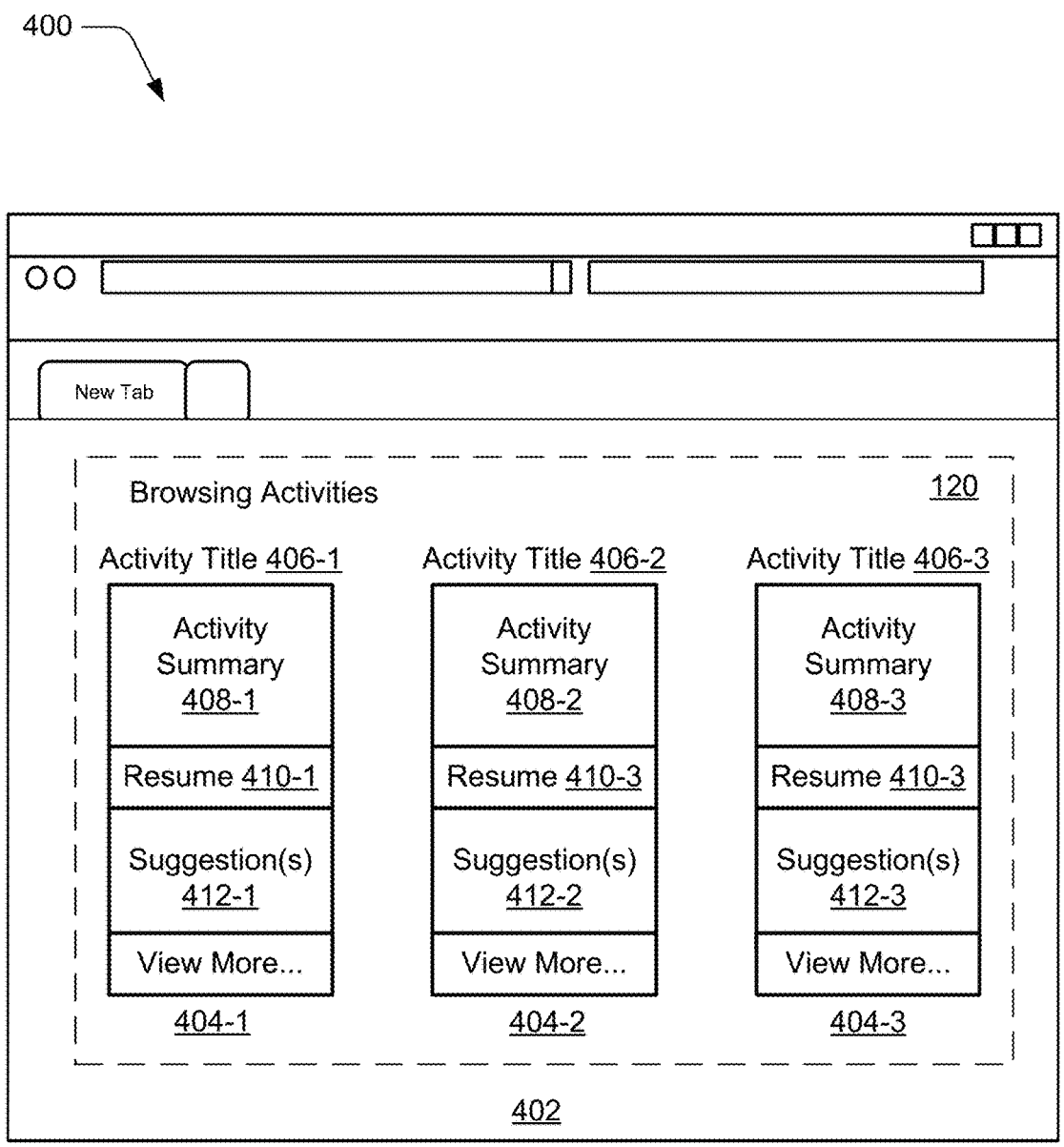
FIG. 4 illustrates an example in which an activity user interface may be implemented.

FIG. 4 illustrates an example 400 in which an activity user interface may be implemented.

In example 400, activity user interface 120 is displayed within a new tab page 402 of web platform 112. Thus, activity user interface 120 can be displayed each time web platform 112 is launched, as well as each time a new tab is opened in web platform 112. It is to be appreciated, however, that activity user interface 120 may be displayed in a variety of different locations and orientations.

In this example, activity user interface 112 displays identifiers of three different browsing activities 404, which are identified from left to right as browsing activities 404-1, 404-2, and 404-3. Each browsing activity 404 includes an activity title 406, an activity summary 408, a resume activity control 410, and one or more suggestion controls 412.

In one or more implementations, activity user interface 120 displays the browsing activities from left to right such that the most recent browsing activity is positioned on the left of activity user interface. In FIG. 4, for example, browsing activity 404-1 may correspond to the most recent browsing activity performed using web platform 112. Alternately, in some cases, activity user interface 120 may display the browsing activity with a highest confidence value as the left-most browsing activity in activity user interface 120.

Activity title 406 may include a category of the browsing activity and/or a topic of the browsing activity. Consider, for example, FIG. 5 which illustrates an example 500 of a browsing activity 502 displayed in an activity user interface. In example 500, a title 504 of browsing activity 502 is "Shopping for a Modern Black Chair".

Returning to FIG. 4, activity summary 408 is configured to provide a summary of websites or other resources accessed by the user using web platform 112 that are associated with the browsing activity. For example, activity summary 408 may provide each website 208 associated with a browsing activity 218 determined at third stage 206 of FIG. 2. Activity summary 408 may include any information useful to provide a summary of the browsing activity, such as snapshots of websites, pictures on websites, videos on websites, and so forth. In FIG. 5, for example, an activity summary portion 506 includes a picture of a modern black chair that was accessed at ebay.com using web platform 112, and a picture of a modern black chair that was accessed at amazon.com using web platform 112.

In one or more implementations, activity summary 408 may also include a "tab summary" that includes a summary of the tabs that were open in web platform 112 during the browsing activity. In FIG. 5, for example, a tab summary 508 indicates that the browsing activity of "shopping for a modern black chair" includes two different amazon.com tabs, and a single ebay.com tab.

In some cases, the tab summary corresponds to the tabs that were open during a single browsing session using web platform 112. Alternately or additionally, the tab summary may include the websites navigated to during a single browsing session within a single tab of web platform 112. For example, the user may navigate to ten different websites related to the activity using a single tab of web platform 112. Alternately or additionally, the tab summary may include websites related to the browsing activity that were accessed during multiple different browsing sessions and/or using multiple different computing devices. For example, a user may have shopped for a modern black chair in the morning using the user's desktop computer at home, and then also shopped for the modern black chair in the evening using the user's smartphone. In this case, the websites related to the browsing activity that were accessed during both of these browsing sessions, using two different devices, may be provided in the tab summary section of activity user interface 120.

In one or more implementations, activity module 116 is configured to filter tabs that are not related to the browsing activity. For example, during a previous browsing session the two amazon.com tabs and the single ebay.com may have been open in web platform 112 along with an espn.com tab. In this case, activity module 116 can determine that the website on espn.com is associated with sports, and thus is not related to the browsing activity of shopping for a modern black chair. Thus, activity module 116 can filter the espn.com tab from the websites related to the browsing activity and from the tab summary in activity user interface 120.

Resume activity control 410 enables the user to resume the browsing activity by launching websites related to the browsing activity in web platform 112. In FIG. 5, for example, the user can select a resume activity control 510 to resume the browsing activity of shopping for the modern black chair. Responsive to selection of the resume activity control, activity module 116 provides the websites related to the browsing activity in web platform 112. In FIG. 5, for example, web platform 112 can launch the two amazon.com tabs and one ebay.com tab associated with shopping for a modern black chair in three different tabs of web platform 112 responsive to receiving a selection of the resume activity control 510.

Suggestion control 412 provides a link to suggestions or recommendations generated by suggestion module 118 which are related to each respective browsing activity. Suggestion control 412 can be configured to display the most relevant suggested websites, which may be determined using an algorithm that ranks the strengths of each suggestion. Selection of suggestion control 412 causes web platform 112 to navigate to the respective suggested website. A view more control is also illustrated which can be selected to show other less relevant suggested websites.

Figure 5:
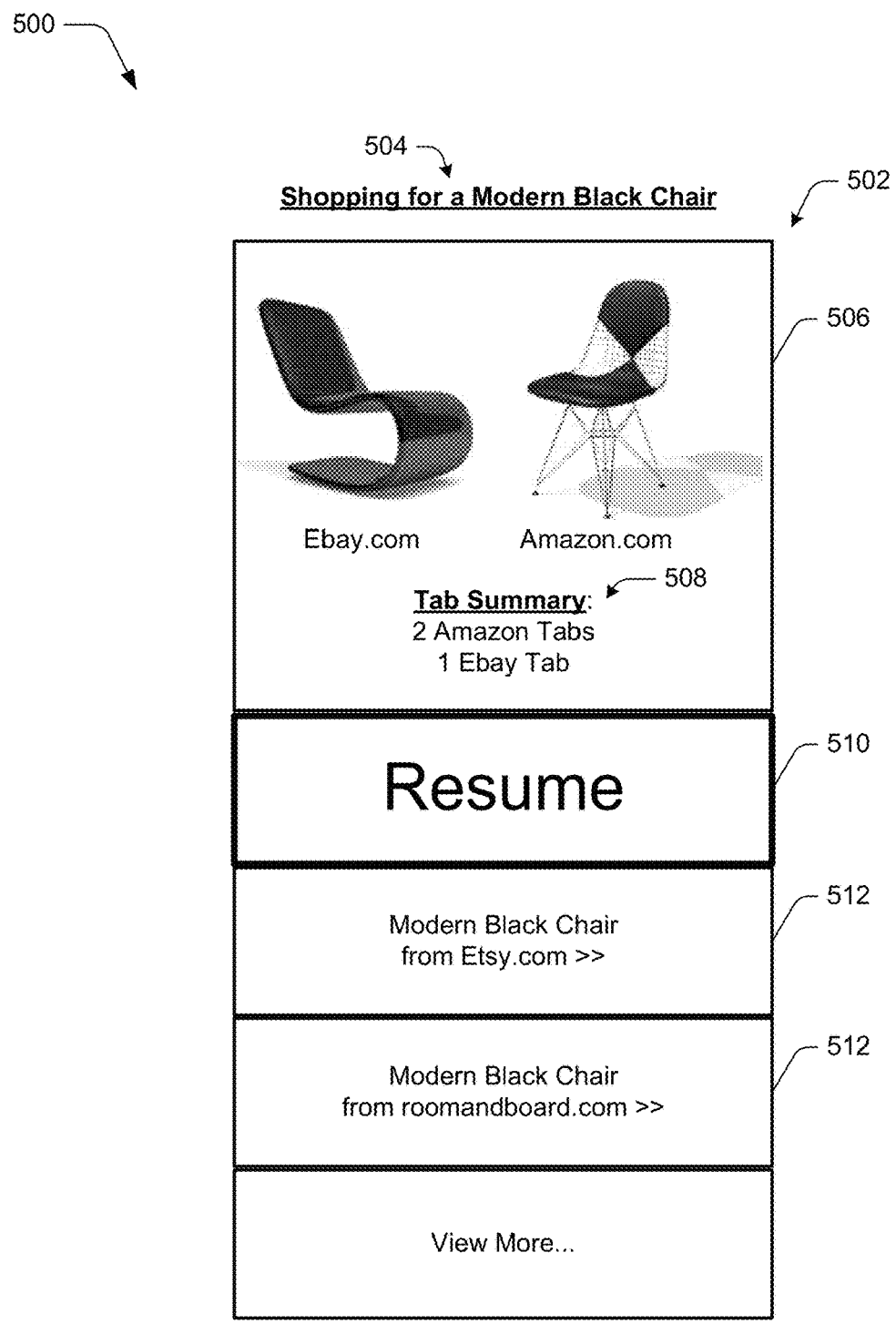
FIG. 5 illustrates an example of a browsing activity displayed in an activity user interface.

In FIG. 5, suggestion control 512 provides a suggestion of a website selling a modern black chair on etsy.com, and a suggestion of a website selling a modern black chair on roomandboard.com. Both of these suggestion controls are selectable to cause navigation to the corresponding website to shop for the modern black chair.

While activity module 116 and suggestion module 118 have been described throughout as being implemented to determine browsing activities and provide suggestions related to web browsing, it is to be appreciated that activity module 116 and suggestion module 118 may be implemented to determine activities and provide suggestions for resources other than websites, such as applications, documents, media content, and so forth.

For example, activity module 116 could be implemented by a game console to determine that the user is performing a certain activity, and to store various resources with the activity to enable the user to subsequently resume the activity. For example, activity module 116 could group related movies, games, and/or music. Further, suggestion module 118 could be implemented by the game console to provide suggestions related to the activity. For example, suggestion module 118 could provide suggested movies, games, or movies which are related to the activity.

As another example, related applications could be grouped together. For example, activity module 116 could determine that a user is preparing a blog post, and group various applications, websites, documents, and/or media content files related to the blog post. For example, a word processing document and a blog post written using the word processing document could be grouped together along with a photo used in the blog post, and a web address of a website at which the blog post is to be published. In the past, to resume the activity of writing the blog post, the user would have to search for each of these different applications, files, or websites, and open each resource separately. Now, the user could quickly resume the activity of writing the blog post by having each of the resources re-opened with a single click.

As another example, activity module 116 could be implemented in a car to store various resources related to driving activities, such as "driving to work. For example, activity module 116 could determine the activity of driving to work, and store the radio station the user listens to in the morning on the way to work, along with navigation directions to get to work, and a preferred temperature setting in the car. Subsequently, the user could easily launch each of these settings when driving to work in the morning Example Methods The methods described herein are shown as sets of blocks that specify operations performed but are not necessarily limited to the order or combinations shown for performing the operations by the respective blocks. The techniques are not limited to performance by one entity or multiple entities operating on one device.

Figure 6:
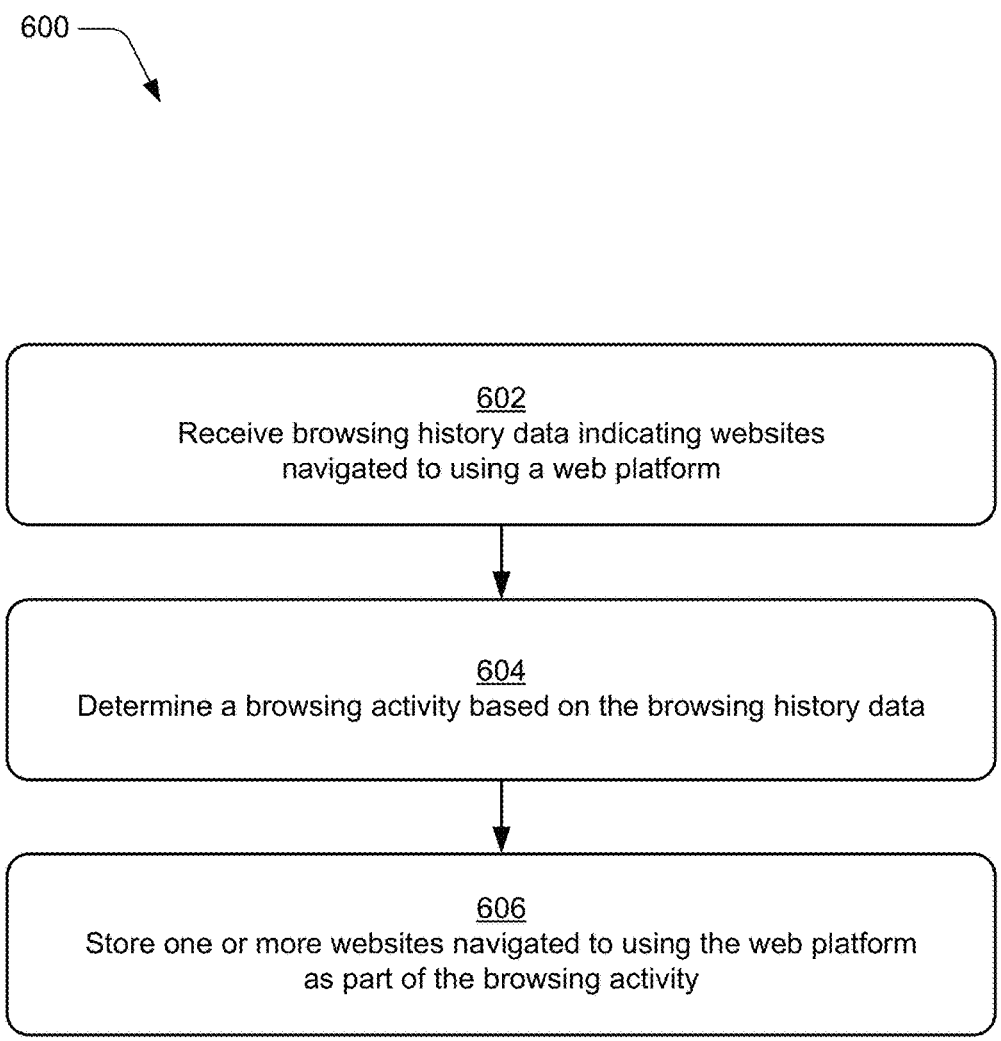
FIG. 6 illustrates an example method of determining browsing activities.

FIG. 6 illustrates an example method 600 of determining browsing activities. At 602, browsing history data indicating websites navigated to using a web platform is received. For example, activity module 116 (FIG. 1) receives browsing history data 114 that indicates websites 208 (FIG. 2) navigated to using web platform 112. In some cases, the browsing history data may include resources other than websites, such as applications, documents, media content files, and so forth.

At 604, a browsing activity is determined based on the browsing history data. For example, activity module 116 determines a browsing activity 218 based on browsing history data 114.

At 606, websites navigated to using the web platform as part of the browsing activity are stored with the browsing activity. For example, activity module 116 stores websites 208 that were navigated to using web platform 112 as part of the browsing activity with browsing activity 218 to enable subsequent access to websites 208. In some cases, resources related to the browsing activity other than websites, such as applications, documents, media content files, may be stored with the browsing activity.

Figure 7:
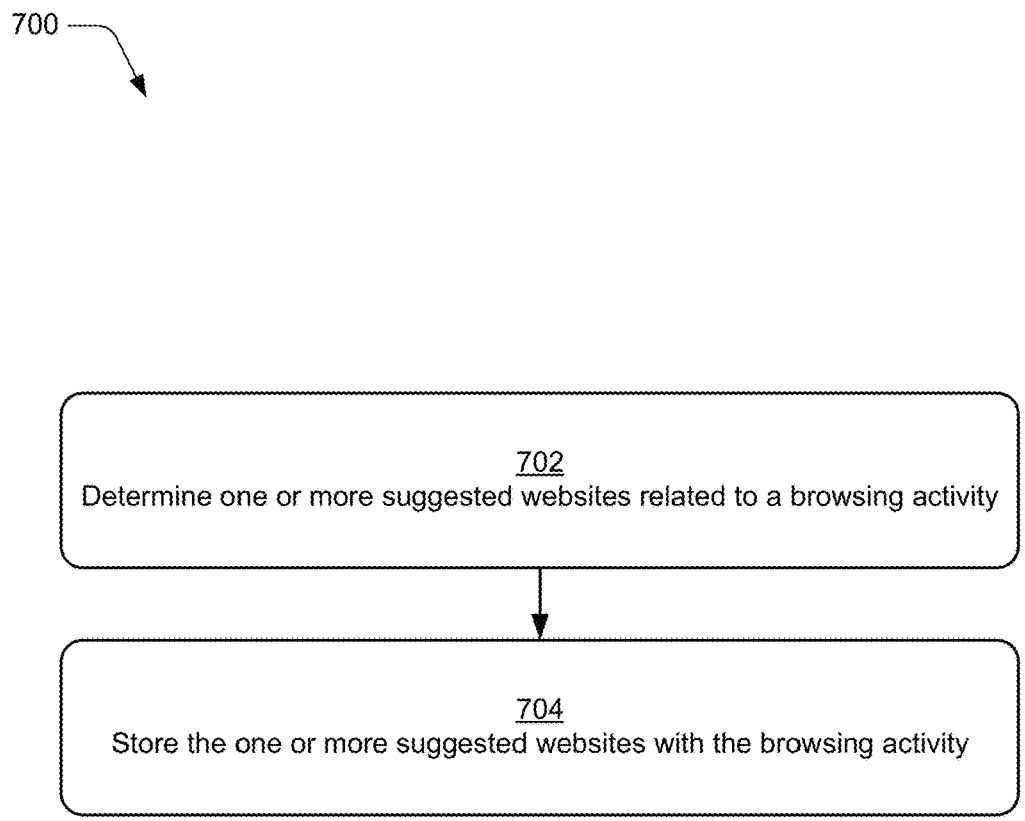
FIG. 7 illustrates an example method of determining suggestions for browsing activities.

FIG. 7 illustrates an example method 700 of determining suggestions for browsing activities. At 702, one or more suggested websites related to a browsing activity are determined. For example, suggestion module 118 (FIG. 1) determines one or more suggested websites 310 (FIG. 3) related to a browsing activity 218 (FIG. 2), such as by searching related website domains 306 using search terms 308 related to the browsing activity.

At 704, the one or more suggested websites are stored with the browsing activity. For example, suggestion module 118 stores one or more suggested websites 310 with each browsing activity to enable subsequent access of the suggested websites by the user.

Example Device

FIG. 8 illustrates an example system 800 that includes an example device 802, which can implement embodiments of determining browsing activities. The example device 802 can be implemented as any of the computing devices described with reference to the previous FIGS. 1-7, such as any type of client device, mobile phone, tablet, computing, communication, entertainment, gaming, media playback, and/or other type of device. For example, computing device 102 shown in FIG. 1 may be implemented as the example device 802.

The device 802 includes communication devices 804 that enable wired and/or wireless communication of device data 806, such as location signature data, positioning system data, and/or wireless radio systems data. Additionally, the device data can include any type of audio, video, and/or image data. The communication devices 804 can also include transceivers for cellular phone communication and for network data communication.

The device 802 also includes input/output (I/O) interfaces 808, such as data network interfaces that provide connection and/or communication links between the device, data networks, and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The device 802 includes a processing system 810 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 802 may further include any type of a system bus or other data and command transfer system that couples the various components within the device. A system bus can include any one or combination of different bus structures and architectures, as well as control and data lines.

The device 802 also includes a computer-readable storage memory 812, such as data storage devices that can be accessed by a computing device, and that provide persistent storage of data and executable instructions (e.g., software applications, programs, functions, and the like). Examples of the computer-readable storage memory 812 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations.

The computer-readable storage memory 812 provides storage of the device data 806 and various device applications 814, such as an operating system that is maintained as a software application with the computer-readable storage memory and executed by the processing system 810. In this example, the device applications include activity module 116 and suggestion module 118 that implements embodiments of determining browsing activities, such as when the example device 802 is implemented as computing device 102 shown in FIG. 1.

The device 802 also includes an audio and/or video system 818 that generates audio data for an audio device 820 and/or generates display data for a display device 822. The audio device and/or the display device include any devices that process, display, and/or otherwise render audio, video, display, and/or image data. In implementations, the audio device and/or the display device are integrated components of the example device 802. Alternatively, the audio device and/or the display device are external, peripheral components to the example device.

In embodiments, at least part of the techniques described for determining browsing activities may be implemented in a distributed system, such as over a "cloud" 824 in a platform 826. The cloud 824 includes and/or is representative of the platform 826 for services 828 and/or resources 830. For example, the services 828 and/or the resources 830 may include the activity module and/or the suggestion module.

The platform 826 abstracts underlying functionality of hardware, such as server devices (e.g., included in the services 828) and/or software resources (e.g., included as the resources 830), and connects the example device 802 with other devices, servers, etc. The resources 830 may also include applications and/or data that can be utilized while computer processing is executed on servers that are remote from the example device 802. Additionally, the services 828 and/or the resources 830 may facilitate subscriber network services, such as over the Internet, a cellular network, or Wi-Fi network. The platform 826 may also serve to abstract and scale resources to service a demand for the resources 830 that are implemented via the platform, such as in an interconnected device embodiment with functionality distributed throughout the system 800. For example, the functionality may be implemented in part at the example device 802 as well as via the platform 826 that abstracts the functionality of the cloud 824.

Conclusion and Example Implementations

Example implementations described herein include, but are not limited to, one or any combinations of one or more of the following examples:

A computer-implemented method comprising receiving browsing history data, the browsing history data indicating websites navigated to using a web platform; determining a browsing activity based on the browsing history data; and storing, with the browsing activity, websites navigated to using the web platform as part of the browsing activity.

A computer-implemented method as described above, wherein determining the browsing activity comprises parsing web addresses of the website in the browsing history data to extract activity data; and analyzing the activity data to determine the browsing activity.

A computer-implemented method as described above, wherein the activity data comprises a domain of the website, and wherein determining the browsing activity comprises determining a category of the browsing activity based on the domain of the website.

A computer-implemented method as described above, wherein the activity data comprises one or more search terms extracted from the web address of the website, and wherein determining the browsing activity comprises determining a topic of the browsing activity based on the one or more search terms.

A computer-implemented method as described above, further comprising determining the websites navigated to using the web platform as part of the browsing activity by locating websites with similar activity data.

A computer-implemented method as described above, further comprising determining, for each browsing activity, one or more suggested websites that are related to the browsing activity.

A computer-implemented method as described above, wherein the determining the one or more suggested websites further comprises identifying one or more related website domains that are related to the browsing activity; determining one or more search terms associated with the browsing activity; and conducting a search on the one or more related website domains using the one or more search terms associated with the browsing activity to locate the one or more suggested websites.

A computer-implemented method as described above, wherein determining the activity data comprises parsing and analyzing page content of the website to generate the activity data.

A computer-implemented method as described above, further comprising causing display of an activity user interface, the activity user interface including an indication of the browsing activity and a resume activity control that, responsive to user selection, automatically launches the websites navigated to using the web platform as part of the browsing activity in one or more tabs of the web platform.

A computer-implemented method as described above, wherein the activity user interface is displayed in a new tab page of the web platform.

A computer-implemented method as described above, wherein the browsing history data includes websites navigated to using the web platform during two or more browsing sessions.

A computing device, comprising a display; and at least a memory and a processor to implement a web platform, the web platform configured to cause display of an activity user interface on the display, the activity user interface including identifiers of one or more browsing activities, each identifier of the one or more browsing activities including: a resume activity control that, responsive to selection, launches websites previously navigated to using the web platform as part of the browsing activity; and a suggestion control that, responsive to selection, launches a suggested website that is relevant to the browsing activity.

A computing device as described above, wherein the suggested website was not previously accessed using the web platform.

A computing device as described above, wherein the activity user interface further includes an activity summary that provides a summary of the websites previously navigated to using the web platform as part of the browsing activity.

A computing device as described above, wherein the activity user interface is displayed in a new tab page of the web platform.

A computing device as described above, wherein each of the identifiers of the one or more browsing activities further includes a tab summary that includes a summary of the tabs that were open in the web platform during performance of the browsing activity.

A system comprising one or more modules, implemented at least partially in hardware, and configured to perform operations comprising determining one or more activities based on user interactions with resources; and storing the resources associated with the activity to enable subsequent access to the resources.

A system as described above, wherein the resources include one or more applications.

A system as described above, wherein the resources include one or more websites.

A system as described above, wherein the resources include at least one website and at least one application.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A computer-implemented method comprising:
   receiving browsing history data, the browsing history data indicating websites navigated to using a web platform during two or more browsing sessions;
   determining a browsing activity based on the browsing history data;
   storing, with the browsing activity, websites navigated to using the web platform as part of the browsing activity;
   identifying one or more related website domains that are related to the browsing activity;
   determining one or more search terms associated with the browsing activity, the one or more search terms submitted during the two or more browsing sessions;
   conducting a search on the one or more related website domains using the one or more search terms associated with the browsing activity to locate one or more suggested websites that were not previously accessed during the two or more browsing sessions and are related to the browsing activity; and
   causing display of an activity user interface, the activity user interface including an indication of the browsing activity and a resume activity control that, responsive to user selection, automatically launches at least one of the websites navigated to using the web platform as part of the browsing activity in one or more tabs of the web platform; and
   generating at least one link that is selectable for navigating to at least one of the one or more suggested websites.

2. The computer-implemented method of claim 1, wherein determining the browsing activity comprises:
   parsing web addresses of the website in the browsing history data to extract activity data; and
   analyzing the activity data to determine the browsing activity.

3. The computer-implemented method of claim 2, wherein the activity data comprises a domain of the website, and wherein determining the browsing activity comprises determining a category of the browsing activity based on the domain of the website.

4. The computer-implemented method of claim 2, wherein the activity data comprises one or more search terms extracted from the web address of the website, and wherein determining the browsing activity comprises determining a topic of the browsing activity based on the one or more search terms.

5. The computer-implemented method of claim 2, further comprising determining the websites navigated to using the web platform as part of the browsing activity by locating websites with similar activity data.

6. The computer-implemented method of claim 1, wherein determining the activity data comprises parsing and analyzing page content of the website to generate the activity data.

7. The computer-implemented method of claim 1, wherein the activity user interface is displayed in a new tab page of the web platform.

8. A computing device, comprising:
a display; and
at least a memory and a processor to implement a web platform, the web platform configured to:
cause display of an activity user interface on the display, the activity user interface including identifiers of one or more browsing activities, each identifier of the one or more browsing activities including:
a summary of websites previously navigated to using the web platform during two or more browsing sessions as part of the browsing activity;
a resume activity control that, responsive to selection, launches the websites previously navigated to using the web platform during the two or more browsing sessions; and
at least one link that, responsive to selection, launches a suggested website that is located using search terms submitted during the two or more browsing sessions and was not previously accessed during the two or more browsing sessions; and
launch the suggested website in a tab of the web platform in response to selection of the suggestion control.

9. The computing device of claim 8, wherein the activity user interface further includes an activity summary that provides a summary of the websites previously navigated to using the web platform as part of the browsing activity.

10. The computing device of claim 8, wherein the activity user interface is displayed in a new tab page of the web platform.

11. The computing device of claim 8, wherein each of the identifiers of the one or more browsing activities further includes a tab summary that includes a summary of the tabs that were open in the web platform during performance of the browsing activity.

12. A system comprising:
one or more modules, implemented at least partially in hardware, and configured to perform operations comprising:
determining one or more activities based on user interactions with resources using two or more devices;
storing the resources associated with the activity to enable subsequent access to the resources;
conducting an automatic search, using search terms submitted during the user interactions with the resources using the two or more devices, to locate one or more suggested resources that were not previously accessed during the one or more activities and are related to the one or more activities; and
causing display of an activity user interface, the activity user interface including an indication of the one or more activities and a resume activity control that, responsive to user selection, automatically launches at least one website corresponding to a resource the user interacted with;
displaying, in the activity user interface, at least one link that is selectable for navigating to the one or more suggested resources; and
navigating to the one or more suggested resources in response to receiving selection of the at least one link.

13. The system of claim 12, wherein the resources include one or more applications.

14. The system of claim 12, wherein the resources include one or more websites.

15. The system of claim 12, wherein the resources include at least one website and at least one application.

16. The system of claim 12, wherein determining further comprises determining one or more activities based on user interaction with resources during two or more sessions.

17. The computer-implemented method of claim 6, wherein the activity user interface further includes an indication of the one or more suggested websites.

18. The computer-implemented method of claim 1, wherein the browsing history data includes websites navigated to using a web platform implemented on two or more different devices.

19. The system of claim 12, wherein determining the one or more activities comprises parsing and analyzing page content of a website to generate activity data.

20. The computer-implemented method of claim 1, wherein the at least one link is incorporated in the activity user interface.

* * * * *